C. BARBIERI

May 2, 1933. PAPER CUP AND BLANK FOR MAKING THE SAME Re. 18,809

Original Filed Feb. 8, 1923

Witnesses
J. W. Angell
O. Hartmann

Inventor
Cesare Barbieri
Charles Hilla
Atty.

by

Reissued May 2, 1933 Re. 18,809

UNITED STATES PATENT OFFICE

CESARE BARBIERI, OF NEW YORK, N. Y., ASSIGNOR TO VORTEX CUP COMPANY, A CORPORATION OF DELAWARE

PAPER CUP AND BLANK FOR MAKING THE SAME

Original No. 1,632,868, dated June 21, 1927, Serial No. 617,672, filed February 8, 1923. Application for reissue filed October 16, 1930. Serial No. 489,216.

This invention relates to flat folded paper cups of a general sector shape. It is an improvement on the invention shown in my application Serial No. 572,518, filed July 3, 1922, for a "paper cup".

It is an object of this invention to present a paper cup of a better appearance.

It is a further object of this invention to devise a paper cup which shall require less accuracy in the manufacture thereof.

It is a further object of this invention to produce a paper cup in which the turned-over end at the bottom shall not make an abrupt shoulder in the surface of the cup.

Other and further important objects of this invention will be apparent from the disclosures in the specification and the accompanying drawing.

The invention (in a preferred form) is illustrated in the drawing and hereinafter more fully described.

Figure 1:
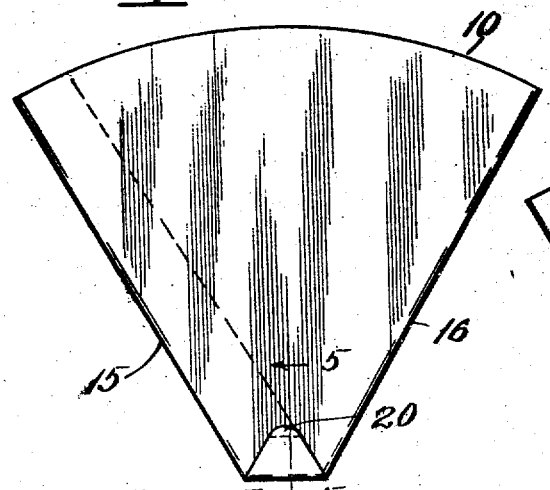
Figure 1 is a side view of the cup.

The cup 10 is of the general form of a sector, except that its point is turned over. The blanks of which the cups are made have an arcuate edge 11 and a radial edge 12. The other straight edge 13 of the blank, instead of being a radius, is parallel but spaced away from a radius so as to provide a flap.

The lower end of the flap 13 is cut at an angle to make a straight edge 17 in line with the edge 12. Between the edge 12 and the edge 17 the blank has a notch so that the center of curvature of the edge 11 is not within the body of the blank but in this notch. The sector bounded by the radii 12 and 16 has a straight edge 18 between it and the notch. In the same way the sector bounded by the radii 15 and 16 has a straight edge 19 between it and the notch. The flap 13, however, instead of having a straight edge separating it from the notch, has a rounded edge, as shown at 20. This rounded end of the flap extends beyond the straight line which, if it were present, would correspond to the lines 18 and 19.

Along the flap 13 is a strip of adhesive material 21 which goes to secure the flap 13 against the surface of the blank near the edge 12 when the cup is being formed. As illustrated, this strip of adhesive stops at the line 23, which, as explained below, is the location of a fold, but the adhesive may, if desired, be continued beyond this line.

The blank is intended to be folded along the radius 15 which separates the flap from the sector proper. Another fold is along the radius 16 which divides the sector approximately in halves.

In making the cup from the blank, the first fold brings the edge 12 onto the folding line 15. The next fold brings the flap 13 into a position where it covers the radial edge 12.

Figure 2:
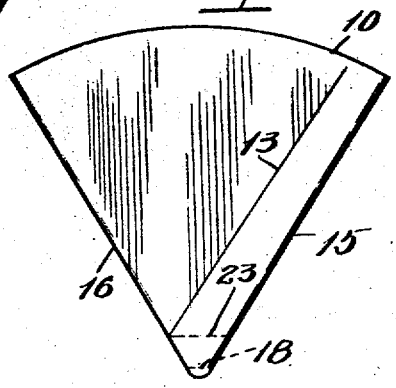
Figure 2 is a view, upon a somewhat smaller scale, of one side of the cup in partly folded condition.
Figure 4:
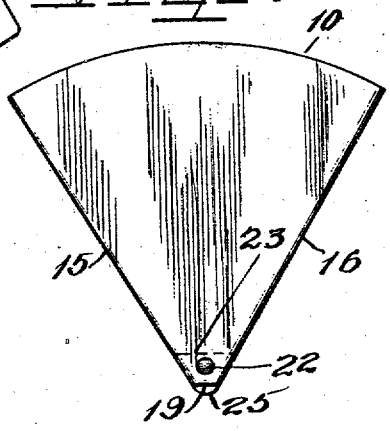
Figure 4 is a view of the other side of the cup in the partially folded condition shown in Figure 2.

After the folds along the lines 15 and 16, as explained, the cup will be in the form shown in Figures 2 and 4. The next step in making the cup is to apply adhesive as shown at 22 and fold the cup along a line 23. Since three thicknesses are folded in this last folding, the line 23 in the flat blank would show as a broken line having three straight parts. The several folds may be provided for in the blank by score marks, creases or any other of the usual means, or the blank may be entirely uniform and the folding done without the assistance of such lines.

Figure 3:
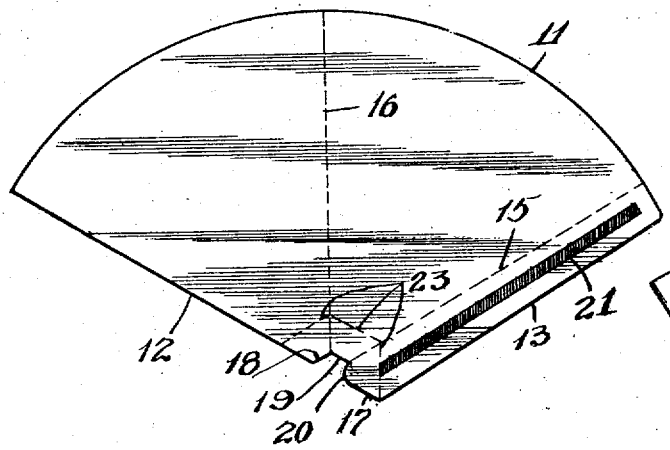
Figure 3 is a view of the blank from which the cup is made.
Figure 5:
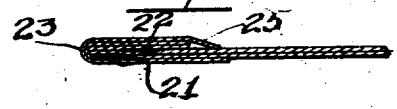
Figure 5 is a section upon an enlarged scale on the line 5—5 of Figure 1.

The adhesive 22 may be applied to the cup when it is in the condition shown in Figure 4, or may be applied to the flat blank before any of the foldings are made. If the latter is done, the adhesive 22 will be on the opposite face of the blank from that shown in Figure 3. Although the adhesive 22 is illustrated as applied to the portion below the line 23 in Figure 4, it is obvious that an equally effective joint may be obtained by applying the adhesive above said line. If the adhesive 21 extends beyond the fold 23, it holds the ply at the point of the cup, which in Figure 5 is illustrated as the top ply, in place. If, however, the adhesive does not extend past the fold 23, this ply will be flat because held by folds at two edges 15 and 23.

After the adhesive is applied and the fold on the line 23 made, pressure is applied to the folded cup to insure that the joints made by the adhesive will be firm. This pressure causes the part 25, which is that portion of the curved part 20 that projects beyond the edges 18 and 19, to become bent as shown in Figure 5. The pressure used to insure that the joint will be firm is large enough and lasts long enough to make the bend in the paper permanent. The cups, after being folded and cemented as described, are ordinarily arranged in piles and the weight of the superposed cups assists in holding the parts 25 in the bent position until the paper becomes set in this position.

If rounded ends, like the end 20, were provided instead of the straight ends 18 and 19, it would be necessary to fold the cup very accurately; otherwise, the rounded edges would fail to be in register and by projecting at one side or the other would cause an unsightly appearance in the finished cup. Also, if the rounded ends were not removed at the edges 18 and 19, they would be between the portion 25 and the body of the cup, making it impossible for this portion to slope downward as shown in Figure 5. The sloping character of this portion makes the edge of the bent-up part a bevel instead of a shoulder. Consequently, when a cup is withdrawn from a stack of cups by a dispensing machine, there is no shoulder likely to catch upon the other cups or on certain parts of the machine and so make trouble. Cups provided with sloping parts 25 are therefore more readily used with dispensing machines.

I am aware that numerous details of construction may be varied through a wide range without departing from the principles of this invention, and I therefore do not purpose limiting the patent granted otherwise than necessitated by the prior art.

I claim as my invention:

1. In a blank for paper cups, a generally sector-shaped body, a flap along one radical side of said body, said body having a notch at the meeting point of said flap and the other radial edge, said notch having two straight edges and one convexed edge, that portion of the blank embodying said edges adpated to be folded over onto the body of the blank.

2. In a blank for paper cups, a generally sector-shaped body, a flap along one radial side of the body, said body having a notch at the meeting point of said flap and the other radial edge, said notch having two straight edges separating it from the body of the blank, and a curvilinear edge separating it from said flap.

3. A sector-shaped cup, embodying a turned-up end at the point of the cup comprising a plurality of superimposed layers of material of substantially equal area, and an exterior layer slightly longer than the others so as to project beyond the underlying layers, said cup being made from a sector-shaped blank having outwardly diverging substantially straight side edges terminating at their outer ends in a curved outer edge and at their inner ends in a fold-up portion for forming a water tight bottom closure, said blank being divided by lines of fold into three sections each section having a transverse line of fold disposed at an angle to the other transverse lines of fold, said three transverse lines of fold being disposed adjacent the inner extremities of said side edges leaving three portions at an angle to each other adapted to be folded upon each other to form said fold-up, one of said portions having a flap-like extension and constituting said exterior slightly longer layer, said three transverse lines of fold being of substantially the same length.

4. A sector-shaped cup, embodying a turned-up end at the point of the cup comprising a plurality of superimposed layers of material of substantially equal area, and an exterior layer slightly longer than the others so as to project beyond the underlying layers, said end being turned upwardly about transverse lines of fold in said layers of material and said transverse lines of fold in said layers being of substantially the same length.

5. A sector-shaped cup, embodying a turned-up end at the point of the cup comprising a plurality of superimposed layers of material of substantially equal area, and an exterior layer slightly longer than the others so as to project beyond the underlying layers, said end being turned upwardly about transverse lines of fold in said layers of material and said transverse lines of fold in said layers being of substantially the same length, said exterior layer including a small rounded centrally disposed tip having converging sides and so located that in the completed cup it terminates beyond said layers.

In testimony whereof, I have hereunto subscribed my name at Washington, D. C.

CESARE BARBIERI.